United States Patent [19]

Leger

[11] Patent Number: 4,779,824

[45] Date of Patent: Oct. 25, 1988

[54] HIGH SPEED CDS EXTRACTION SYSTEM

[75] Inventor: James E. Leger, Enon, Ohio

[73] Assignee: The United States of America as represented by the Secretary of the Air Force, Washington, D.C.

[21] Appl. No.: 145,155

[22] Filed: Jan. 19, 1988

[51] Int. Cl.$^4$ .............................................. B64D 1/02
[52] U.S. Cl. ................................................. 244/137.3
[58] Field of Search .......................... 244/137.1, 137.3

[56] References Cited

U.S. PATENT DOCUMENTS

| | | | |
|---|---|---|---|
| 2,868,581 | 1/1959 | Minty et al. | 294/83 |
| 3,096,055 | 7/1963 | Cotton | 244/137 |
| 3,113,751 | 12/1963 | Cotton | 244/137 |
| 3,396,924 | 8/1968 | Kriesel | 244/137 |
| 3,610,674 | 10/1971 | Janssen | 294/83 |
| 3,724,788 | 4/1973 | Petry et al. | 244/137 R |
| 3,781,055 | 12/1973 | Keich et al. | 294/83 A |
| 3,801,051 | 4/1974 | Hosterman et al. | 244/137 R |
| 3,865,333 | 2/1975 | Fielding et al. | 244/151 B |
| 3,872,556 | 3/1975 | Frost | 24/230 A |
| 4,303,213 | 12/1981 | Bolender et al. | 244/137 R |
| 4,398,686 | 8/1983 | Leger et al. | 244/137 R |
| 4,651,957 | 3/1987 | Minnich II | 244/137 L |

OTHER PUBLICATIONS

Aerial Delivery by Cargo Transport Aircraft, J. R. Gibson, et al., Apr. 1983.

*Primary Examiner*—Galen Barefoot
*Assistant Examiner*—Rodney Corl
*Attorney, Agent, or Firm*—Donald J. Singer; Fredric L. Sinder

[57] ABSTRACT

An aircraft container delivery system is described. An ejector frame is positioned forward of a pair of rows of cargo containers to push the containers out the rear opening of an aircraft. An extraction line connects an extraction parachute to an extractor mechanism, upon which the ejector frame is attached, to provide the extraction force. The extraction mechanism includes base plates attached to the ejector frame. To the base plates are attached a rotatable clevis hook and a shock strut. The rotatable clevis hook holds a clevis on the end of the extraction line. The shock strut connects the base plates to a tow bar. The tow bar includes a latch that secures the clevis hook in position to hold the clevis, a pair of rotatable strike arm fingers and a draw bar hook. A stirrup gate mechanism is mounted at the rear of the aircraft and holds the extraction line beneath the containers as the ejector frame is pulled rearward. When the ejector frame and ejector mechanism reaches the stirrup mechanism, the strike arm fingers rotate over a strike arm to push open a pair of strike arms and open the gate to free the extraction line. The draw bar hook strikes the stirrup bar to stop the draw bar. The kinetic energy of the still rearward moving ejector frame breaks loose the clevis hook from the clevis to disconnect the extraction line. The shock strut absorbs the remaining kinetic energy of the ejector frame.

8 Claims, 4 Drawing Sheets

Fig. 2

Fig. 4

HIGH SPEED CDS EXTRACTION SYSTEM

RIGHTS OF THE GOVERNMENT

The invention described herein may be manufactured and used by or for the Government of the United States for all governmental purposes without the payment of any royalty.

BACKGROUND OF THE INVENTION

The invention relates to systems for airdropping cargo from aircraft, and more particularly to container delivery systems CDS) for airdropping multiple CDS containers at high aircraft speeds.

Airdrops of equipment and supplies from rear opening cargo aircraft, such as C-130's and C-141's, are performed by various different methods to satisfy different requirements.

Low-velocity airdrops are used to airdrop very heavy (greater than 2500 pounds) individual loads from altitudes of 1200 to 1500 feet above ground level. Aircraft speeds are about 130 to 150 knots. The load is attached to a energy absorbing pallet, or platform, which rides on aircraft floor rollers. As extraction parachute pulls the load and pallet from the rear of the aircraft. Recovery parachutes are attached to the load and pallet to lower them at low velocity to the ground.

Low altitude parachute powered ejection systems (commonly called LAPES) are used to airdrop very heavy individual loads with very accurate targeting. The aircraft makes a low altitude approach from about 200 feet altitude and 130 knots airspeed. An extraction parachute pulls out the load and pallet at about a ten foot altitude while the aircraft makes an immediate pullout to clear ground obstacles and establish a desired flight path. A typical low altitude powered ejection system includes an extraction parachute for pulling the load and pallet from the rear of the aircraft, an extraction line for connecting the extraction parachute to the load and pallet, and a command-operated towplate for holding and then releasing a link connecting two sections of the extraction line to precisely begin the airdrop at the proper time.

Low velocity container delivery systems CDS) are used to airdrop multiple medium weight (625 to 2200 pounds) containers, or cargo bundles, from altitudes ranging from 600 feet to 25,000 feet, with 1000 feet the most common altitude. The containers are generally arranged in paired rows on individual energy absorbing pallets riding on aircraft floor rollers. The aircraft is maintained at a sufficient positive deck angle, typically five degrees, so that the containers are removed from the aircraft by gravity. Each container generally has a separate recovery parachute for controllinq descent to the qround. Static lines are generally used to deploy each recovery parachute as each container leaves the aircraft.

High-velocity airdrops allow the dropped containers to fall at only a partially retarded rate, or in complete free fall, to minimize the size of the drop zone required for high altitude drops. Very elaborate energy absorbing pallets are used to prevent destruction to the airdropped articles.

It is desired to perform CDS airdrops at higher aircraft speeds to enhance the survivability of the aircraft in combat environments. Unfortunately, container delivery systems do not work well at high aircraft speeds, primarily due to reduced deck altitudes. Also, the cargo containers in present systems do not exit at predictable times and do not land reliably on target. They are especially affected by wind drift.

To be successful, high speed CDS airdrops require increased drop accuracy and more predictable exit times to ensure that the cargo is dropped on target. Additionally, the containers must be grouped together better than is presently done to reduce scatter on the ground.

It is seen, therefore, that there is a need for an improved container delivery system that is particularly suitable for high speed airdrops.

It is, therefore, a principal object of the invention to provide a container delivery system that has high drop accuracy with predictable exit times, and that drops its containers with minimum scatter.

It is another object of the invention to provide an extraction parachute powered mechanism for removing CDS containers at high aricraft speeds.

It is yet another object of the invention to provide an improved mechanism and method for automatically disconnecting the extraction line and parachute after the airdrop has been completed.

It is a further object of the invention to use to the greatest possible extent existing components from other airdrop systems.

It is a feature of the invention that it provides for emergency release of the extraction line in the event the system jams.

It is an advantage of the invention that it provides tight grouping of the containers as they exit the aircraft.

SUMMARY OF THE INVENTION

The invention provides a system for airdropping CDS containers at both low and high aircraft speeds. The unique dlscovery of the invention ls that the problems of airdropping CDS containers at high aircraft speeds and with minimum scatter can be solved by using, with an extraction parachute, an ejector assembly comprising an ejector frame, an ejector mechanism and a stirrup gate mechanism. The ejector mechanism applies the extraction force received from the extraction parachute to an ejector frame at the front of a row of CDS containers to push the containers out the rear of the plane. The ejector mechanism releases the extraction line as the last containers exit and snubs the moving ejector frame to absorb its kinetic energy. The stirrup gate mechanism holds the extraction line flat during the extraction, and then stops the ejector mechanism and triggers the release of the extraction line from the ejector mechanism as it opens its gate to free the line.

Accordingly, the invention is directed to an apparatus and method for an aircraft container delivery system for removing a row of cargo containers from the rear of an aircraft. The invention comprises an ejector frame positioned inside the aircraft next to the forward end of the row of cargo containers, an ejector mechanism attaching the ejector frame to, for example, a centerline rail system, an extraction parachute, an extraction line connecting the extractor mechanism to the ejection parachute, stirrup means substantially at the rear of the aircraft for holding the extraction line to substantially prevent its vertical movement, disconnect means included in the ejector mechanism for disconnecting the extraction line from the ejector mechanism when the ejector mechanism reaches generally the rear of the aircraft, gate means included in the stirrup means for freeing the extraction line when the ejector mechanism reaches generally the rear of the aircraft, means for stopping the rearward movement of the ejector mechanism when the ejector mechanism reaches generally the rear of the aircraft, and means included in the ejector mechanism for absorbing the kinetic energy of the rearward movement of the ejector frame when the ejector mechanism is stopped.

The invention may further comprise a clevis attached to the extraction line where it connects to the ejector mechanism, wherein the ejector mechanism comprises base plate means attached to the ejector frame, a clevis hook rotatably attached to the base plate means for attaching to the clevis on the extraction line first end, the clevis hook including a cutout, shock absorbing means connecting the base plate means to a draw bar, means on the draw bar for allowing the draw bar to move relative to the aircraft, a spring-loaded latch rotatably attached to the draw bar so that the latch fits into the cutout on the clevis hook to prevent the clevis hook from rotating to disconnect it from the clevis. A stirrup hook is defined on the rearward end of the draw bar and strike arm fingers are rotatably attached to the rear end of the draw bar.

The stirrup means may include a pair of co-linear strike arms connect by a plurality of linking means to the gate means so that the strke arms, when pushed apart, open the gate means to free the extraction line, a fixed stirrup bar positioned so that: (1) when struck by the strike arm fingers, the strike arm fingers will rotate over the stirrup bar and be positioned to strike and push apart the strike arms; and, (2) it will engage the draw bar hook to stop rearward movement of the draw bar, so that the rearward kinetic energy of the ejector frame and ejector frame base plate means will break free the clevis hook from the latch on the stopped draw bar to thereby allow the clevis hook to rotate and disconnect from the clevis on the extraction line.

The stirrup means maY include ramp means to assist the movement of the extraction line end out the opened gate means.

The ejector mechanism may also comprise slip hook means attached to the base plate means in place of the clevis hook and spring-loaded latch mechanism.

The disclosed method includes: (a) while the extraction line pulls on the ejector frame, holding the extraction line to substantially prevent its vertical movement at the rear of the aircraft; (b) when the ejector frame reaches the rear of the aircraft, freeing the extraction line to allow its vertical movement and disconneoting it from the ejector frame; and, (c) when the ejector frame reaches the rear of the aircraft, snubbing its rearward movement to compliantly stop it and absorb its kinetic energy.

DESCRIPTION OF THE DRAWINGS

The invention will be more clearly understood from a reading of the following detailed description in conjunction with the accompanying drawings wherein:

FIGS. 1.a.-1.e. are side views of sequential steps in the operation of an container delivery system according to the teachings of the invention;

FIGS. 3.a.-3.c. are side views of sequential steps in the operation of the ejector mechanism and a stirrup gate mechanism showing release of the extraction line; and, FIG. 4 is a perspective view of a stirrup gate mechanism showing a dashed line representation of movement of the strike arm fingers and an electro-explosive knife for emergency release of the extraction line.

DETAILED DESCRIPTION

Referring now to FIGS. 1.a.-1.e. of the drawings, there is shown the general operation of a container delivery system according to the teachings of the present invention. FIG. 1.a. shows inside an aircraft 10 the initial rigging of a dual row (the second row is hidden behind the first in this view) of cargo oontainers 12. The container XX rows are set on either side of a centerline vertical rail (CVR) 14, a typical LAPES component. The containers 12 are each fastened to the top of separate plywood pallets 16, which, when the containers are ejected, roll along conveyor rollers set into the floor of the aircraft. Each pallet 16 generally includes a honeycomb structure for absorbing energy when a container 12 and pallet 16 together strike the ground. Separate recovery parachutes 18 are attached to the top of each container 12 and, by separate static lines 20, to an overhead cable 21.

An ejector frame 22 sits forward of the container 12 rows and is attached to an ejector mechanism 21 (largely hidden in FIGS. 1.a-.1.e.) that allows it to ride along centerline vertical rail 14 to push the containers 12 out of aircraft 10. An extraction line 26, comprising inner and outer extraction lines connected by a towplate link 28, attaches at one end to ejector mechanism 24 and at its other end to an extraction parachute 30. Extraction line 26 runs under centerline Vertical rail 14 and through a stirrup gate mechanism 32. Towplate link 28 is part of a standard LAPES towplate 34. A lanyard knife 36 is attached by a lanyard 38 to towplate link 28 so that, as shown in FIG. 1.b, when the towplate link is released, lanyard knife 36 cuts through an aft gate 40 restraining cargo containers 12. Extraction line 26 then pulls ejector mechanism 24 and ejector frame 22 along centerline vertical rail 14 to push containers 12 outside aircraft 10, as shown in FIG. 1.c.

FIG. 1.d. shows ejector frame 22 being stopped at stirrup gate mechanism 32 and extraction line 26 automatically releasing. The relative momentum already imparted to the rows of cargo containers 12 is sufficient to complete extraction, as shown in the figure.

FIG. 1.e. shows ejector frame 22 telescoping through a shock strut 42 to absorb its kinetic energy.

Figure 1A:
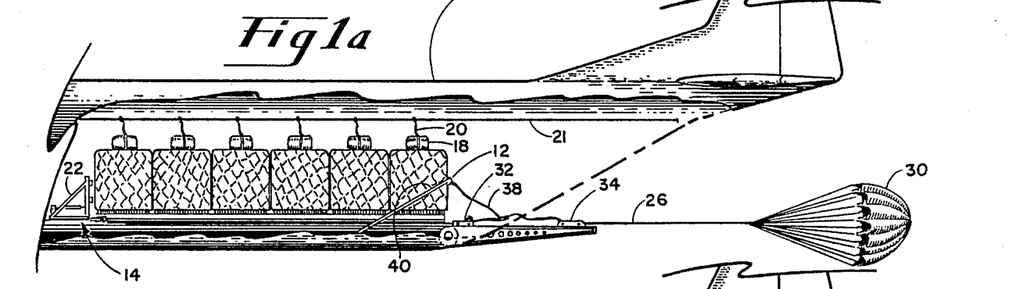
Figure 1B:
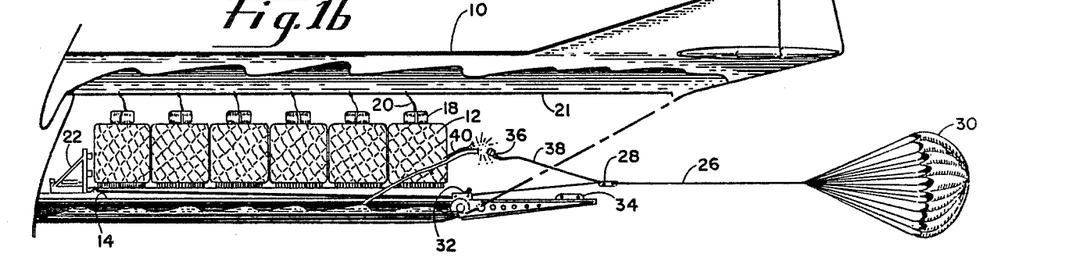
Figure 1C:
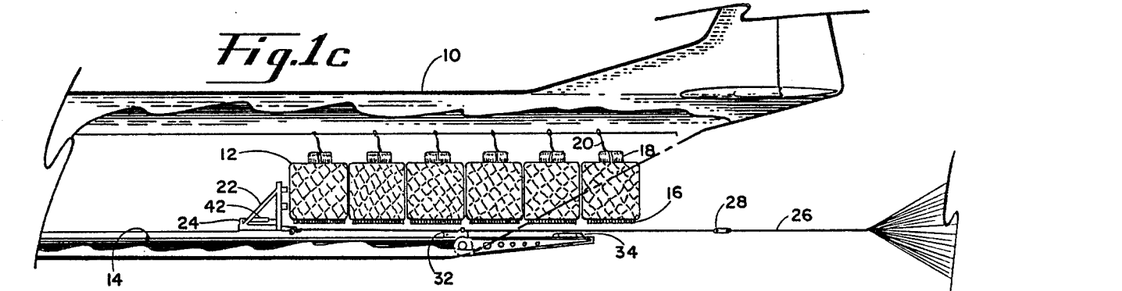
Figure 1D:
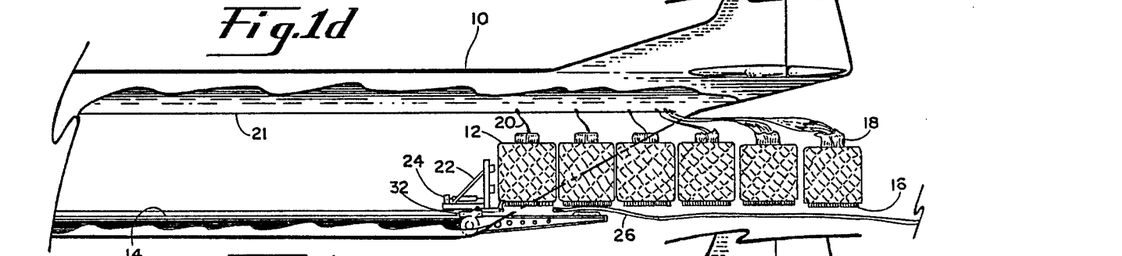
Figure 1E:
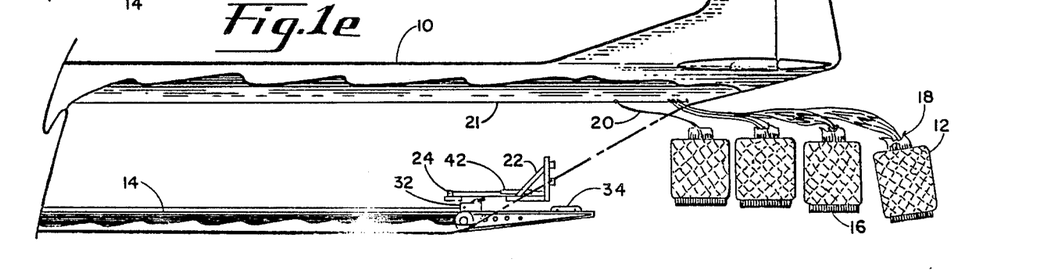
Figure 2:
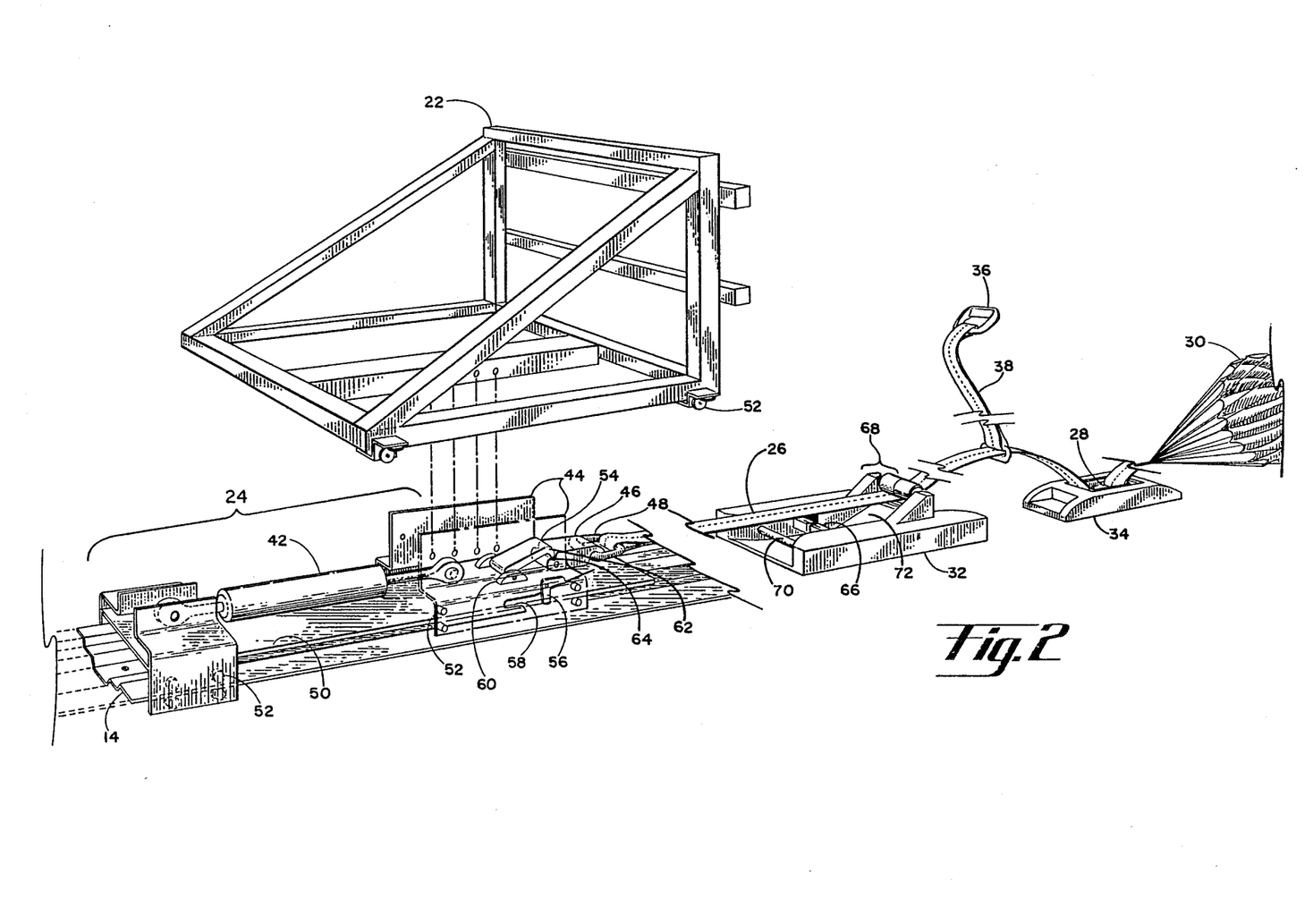
FIG. 2 is a foreshortened perspective view of the basic components of the ejector frame and ejector mechanism.

FIG. 2 shows a perspective view of ejector frame 22 and ejector mechanism 24. Stirrup gate mechanism 32 and towplate 34 are shown in foreshortened positions relative to ejector mechanism 24 and ejector frame 22 to fit within a single drawing.

Ejector mechanism 24 includes base plates 44 which attach ejector frame 22 to ejector mechanism 24 and between which is rotatably attached a clevis hook 46 for holding a release clevis 48 attached to the end of extraction line 26. The shock strut 42 connects base plates 44 to a draw bar. 50. The entire ejector mechanism 24 and ejector frame 22 move along centerline vertical rail assembly 14 on guide rollers 52. Additional guide rollers 52 stabilize ejector frame 22 against outside rails (not shown). As is more fully described below, draw bar 50 includes a latch 54 for locking clevis hook 46 in a down position to hold release clevis 48.

Strike arm fingers 56 are rotatably attached at the ends of draw bar 50 and, as described below, when ejector frame 22 reaches the end of centerline vertical rail assembly 14, open stirrup gat mechanism 32 to release extraction line 26.

A stirrup hook 58 is located below the front end of draw bar 50. When ejector mechanism 24 reaches the end of its travel. stirrup hook 58 engages stirrup gate mechanism 32 and stops draw bar 50, thereby, through shock strut 42, snubbing the movement of ejector frame 22.

Figure 3A:
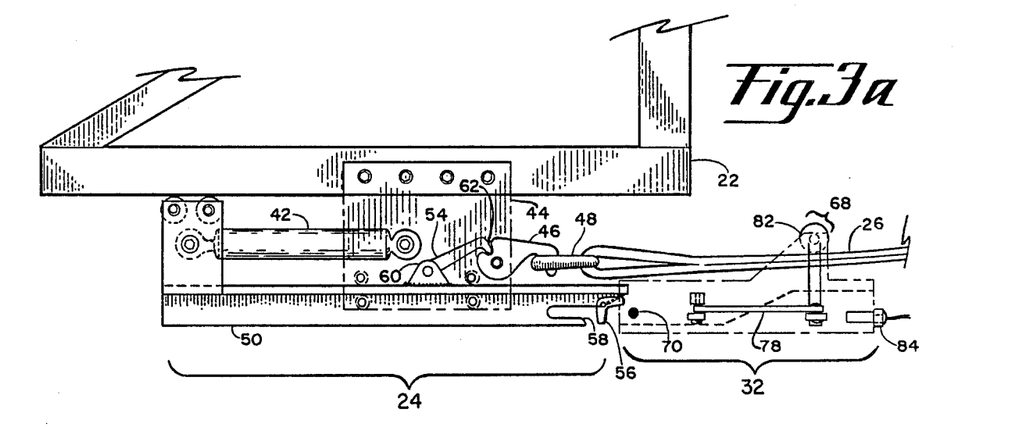
Figure 3B:
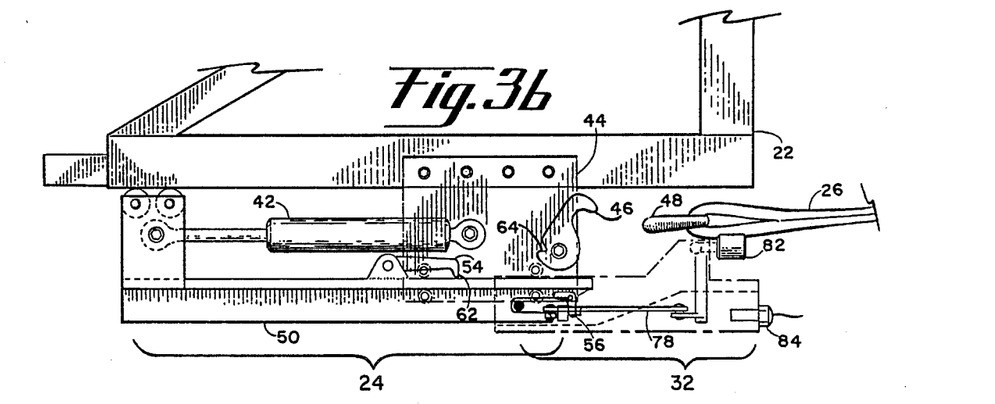
Figure 3C:
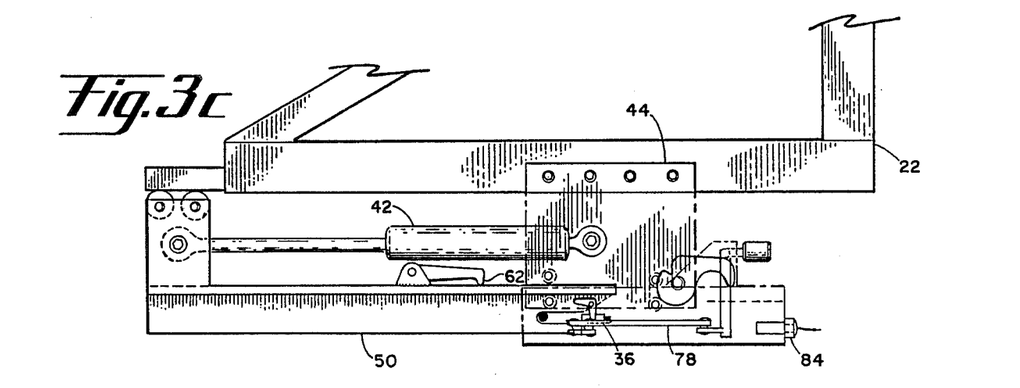

FIGS. 3.a.–3.c. show a more detailed view of the apparatus and process for stopping draw bar 50 and snubbing ejector frame 22. FIG. 3.a. shows ejector mechanism 24 just before it reaches the end of its travel and as draw bar 50 approaches stirrup gate mechanism 32. A spring 60 (not shown) on draw bar 50 loads latch 54 to hold a latch tooth 62 in compression inside a cutout 64 in clevis hook 46. Latch tooth 62 and cutout 64 are shaped so that latch 54 resists removal from clevis hook 46. The spring loading, which may be accomplished by any number of means known in the art, is intended primarily to hold latch tooth 62 in place while the fit between latch 54 and clevis hook 46 holds draw bar 50 and, through base plates 44, ejector frame 22 together. When ejector mechanism 24 is at the beginning of its travel, as shown in FIG. 1.a. the fit between latch 54 and clevis hook 46 is sufficient to hold against the sudden force of extraction line 26 as it pulls taut when towplate 34 releases link 28, as shown in FIG. 1.b. After link 28 is released, draw bar 50 will freely roll along centerline vertical rail 14. The resistance to sudden movement provided by shock strut 42 will further aid to hold draw bar 50 and ejector frame 22 together.

FIG. 3.b. shows ejector mechanism 24 just after draw bar 50 enters stirrup gate mechanism 32. Strike arm fingers 56, as is described below, have struck and rotated a pair of strike arms 66 to open gate 68. The rearward movement of draw bar 50 has been stopped by stirrup hook 58 engaging a stirrup bar 70. The rearward momentum of ejector frame 22 and base plates 44 is sufficient to pull clevis hook 46 loose from latch 54 so that clevis hook 46 will lift to release release clevis 48 and, through now open gate 68, allow the release of extraction line 26. A series of ramps (such as ramp 72 shown in FIG. 4) help move release clevis 48 and extraction line 26 up and out gate 68.

FIG. 3.c. shows ejector frame 22 continuing to move rearward relative to draw bar 50. Shock strut 42 snubs the rearward motion by absorbing most of the kinetic energy of ejector frame 22.

Figure 4:
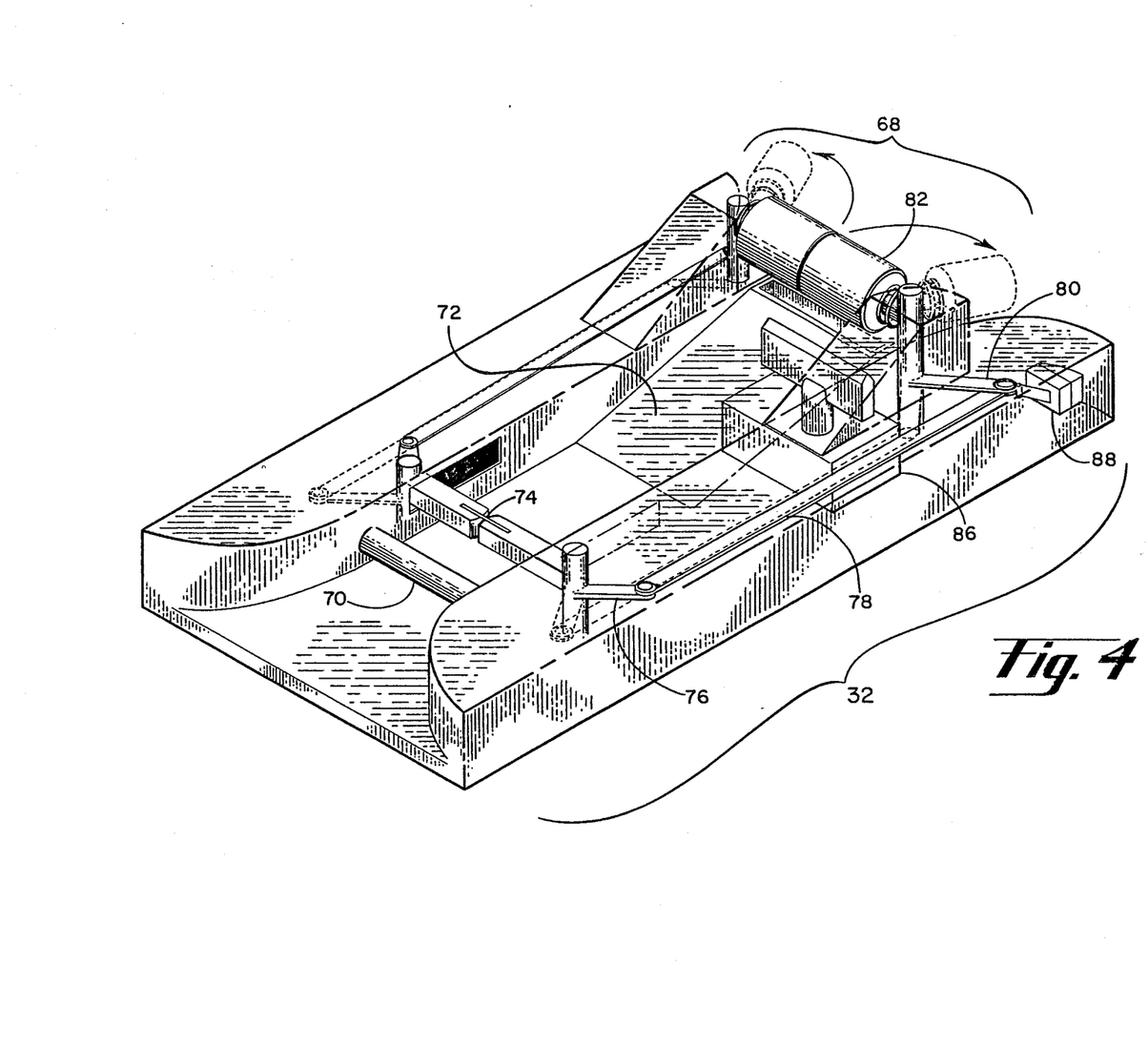

FIG. 4 shows dashed line representations of the operation of strike arms 66 and gate 68 of stirrup gate mechanism 32. FIGS. 3.a. and 3.b. indicate how strike arm fingers 56 rotate to clear stirrup bar 70 and reposition themselves to strike strike arms 66, breaking shear pin 74 and pushing apart strike arms 66. The lever arm action of crank arms 76, connecting links 78 and crank arms 80 move apart rollers 82 and thereby open gate 68.

FIG. 4 alsoshows a squib 84 (shown in FIGS. 3.a–.3.c) powered electro-explosive knife assembly 86 for severing extraction line 26 in the event of a jam in the system. Apparatus for connecting the exposive gases from squib 84 to a knife piston in knife assembly 86 are well known in the art and are not shown to avoid confusing clutter in the drawings. Squib 84 may be remotely actuated by a crewmember. For operator safety, a microswitch 88 permits actuation only when rollers 82 are in the closed position.

The described invention uses a notched clevis hook and a spring loaded latch to hold and then release the clevis on the end of the extraction line. Those with skill in the art of the invention will see that this apparatus is an example of a more general slip hook, and that other slip hook apparatus, or other even more general disconnect means, may be substituted as a functional equivalent for that element of the described apparatus.

The disclosed container delivery system successfully demonstrates the use of a parachute provided extraction force transmitted by an extraction line to an extraction mechanism and ejector frame pushing from the front of rows of cargo containers, thereby providing more accurate drops with reduced scatter and permitting airdrops at higher aircraft speeds. Although the disclosed use is specialized, it will find application in other areas of material handling.

It is understood that certain modifications to the invention as described may be made, as might occur to one with skill in the field of the invention. Therefore, all embodiments contemplated have not been shown in complete detail. Other embodiments may be developed without departing from the spirit of the invention or from the scope of the claims.

I claim:

1. An aircraft container delivery system for removing a row of cargo containers from the rear of the aircraft, comprising:
   (a) an ejector frame positioned inside the aircraft next to the forward end of the row of cargo containers so that rearward movement of the ejector frame pushes the cargo containers out the rear of the aircraft;
   (b) an ejector mechanism attached to the ejector frame, wherein the ejector mechanism includes means for allowing the ejector mechanism and ejector frame to move relative to the aircraft;
   (c) an extraction parachute;
   (d) an extraction line at a first end connected to the ejector mechanism and at a second end operatively connected to the extraction parachute;
   (e) stirrup means for holding the extraction line to substantially prevent its vertical movement, the stirrup means positioned generally at the rear of the aircraft;
   (f) disconnect means included in the ejector mechanism for disconnecting the extraction line from the ejector mechanism when the ejector mechanism reaches generally the rear of the aircraft;
   (g) gate means included in the stirrup means for freeing the extraction line when the ejector mechanism reaches generally the rear of the aircraft;
   (h) means for stopping the rearward movement of the ejector mechanism when the ejector mechanism reaches generally the rear of the aircraft; and,
   (i) means included in the ejector mechanism for absorbing the kinetic energy of the rearward movement of the ejector frame when the ejector mechanism is stopped.

2. The aircraft container deliVery system according to claim 1, wherein the aircraft has a centerline vertical rail and the means for allowing the ejector mechanism and ejector frame to move relative to the aircraft includes rollers.

3. The aircraft container delivery system according to claim 1, further comprising a clevis attached to the extraction line first end, and wherein the ejector mechanism comprises:
  (a) base plate means attached to the ejector frame;
  (b) a clevis hook rotatably attached to the base plat means for attaching to the clevis on the extraction line first end, the clevis hook including a cutout;
  (c) shock absorbinq means having a first end and a second end, its first end attached to the base plate means;
  (d) a draw bar attached to the second end of the shock absorbing means, the draw bar having a rearward end;
  (e) means on the draw bar for allowing the draw bar to move relative to the aircraft;
  (f) a spring-loaded latch rotatably attached to the draw bar so that the latch fits into the cutout on the clevis hook to prevent the clevis hook from rotating to disconnect it from the clevis;
  (g) a stirrup hook defined on the rearward end of the draw bar; and,
  (h) strike arm fingers rotatably attached to the rearward end of the draw bar.

4. The aircraft container delivery system according to claim 3, wherein the stirrup means further include:
  (a) a pair of co-linear strike arms;
  (b) a plurality of linking means connecting the strike arms to the gate means so that the strike arms, when pushed apart, open the gate means to free the extraction line; and,
  (c) a fixed stirrup bar positioned so that:
    (i) when struck by the strike arm fingers, the strike arm fingers will rotate over the stirrup bar and be positioned to strike and push apart the strike arms; and,
    (ii) it will engage the draw bar hook to stop rearward movement of the draw bar, so that the rearward kinetic energy of the ejector frame and ejector frame base plate means will break free the clevis hook from the latch on the stopped draw bar, thereby allowing the clevis hook to rotate and disconnect from the clevis on the extraction line first end.

5. The aircraft container delivery system according to claim 4, wherein the stirrup means includes ramp means to assist the movement of the extraction line first end out the opened gate means.

6. An ejector mechanism for moving an ejector frame relative to an aircraft to push cargo containers out the rear of the aircraft, the ejector mechanism being connectable to an extraction line having a first end with an attached clevis and a second end attached to an extraction parachute, comprising:
  (a) base plate means for attaching to the ejector frame;
  (b) slip hook means attached to the base plate means for connecting to the clevis on the extraction line first end;
  (c) shock absorbing means having a first end and a second end, its first end attached to the base plate means;
  (d) a draw bar attached to the second end of the shock absorbing means, the draw bar having a rearward end;
  (e) means on the draw bar for allowing the draw bar to move relative to the aircraft;
  (f) a stirrup hook defined on the rearward end of the draw bar; and,
  (g) strike arm fingers rotatably attached to the rearward end of the draw bar.

7. A stirrup gate for substantially preventing vertical movement of a parachute extraction line during extraction of cargo containers from the rear of an aircraft and then releasing the extraction line as extraction is completed, comprising:
  (a) gate means for substantially preventing vertical movement of the parachute extraction line as it runs below the gate means;
  (b) a pair of co-linear strike arms;
  (c) a plurality of linking means connecting the strike arms to the gate means so that the strike arms, when pushed apart, open the gate means to free the extraction line; and,
  (d) a fixed stirrup bar positioned above the parachute extraction line and forward, relative to the aircraft, of the gate means.

8. A method of extracting a row of cargo containers from the rear of an aircraft, comprising the steps of:
  (a) providing an ejector frame positioned inside the aircraft next to the forward end of the row of cargo containers;
  (b) providing an extraction parachute;
  (c) providing an extraction line operatively connected at a first end to the ejcctor frame and at a second end to the extraction parachute, so that the extraction parachute and extraction line longitudinally pull on the e ecor frame to push the row of cargo containers out the rear of the aircraft;
  (d) while the extraction line pulls on the ejector frame, holding, at a first position generally in the rear of the aircraft, the extraction line to substantially prevent its vertical movement;
  (e) when the ejector frame reaches near a second position generally in the rear of the aircraft, freeing the extraction line to allow its vertical movement at said first position generally in the rear of the aircraft;
  (f) when the ejector frame reaches near the second position generally in the rear of the aircraft, disconnecting the extraction line at its first end; and,
  (g) when the ejector frame reaches ear the second position generally in the rear of the aircraft snubbing its rearward movement to compliantly stop it and absorb its kinetic energy.

* * * * *

UNITED STATES PATENT AND TRADEMARK OFFICE
CERTIFICATE OF CORRECTION

PATENT NO. : 4,779,824
DATED : October 25, 1988
INVENTOR(S) : James E. Leger

It is certified that error appears in the above-identified patent and that said Letters Patent is hereby corrected as shown below:

Col 1, line 13, replace "CDS) with -- (CDS) --.
Col 1, line 24, replace "As" with -- An --.
Col 1, line 44, replace "CDS)" with -- (CDS) --.
Col 1, line 55, replace "qround" with -- ground --.
Col 2, line 19, correct the spelling of "aircraft".
Col 2, line 36, replace "dlscovery" with -- discovery --.
Col 2, line 36, replace "ls" with -- is --.
Col 3, line 27, correct the spelling of "strike".
Col 3, line 39, replace "maY" with -- may --.
Col 3, line 50, correct the spelling of "disconnecting".
Col 4, line 14, correct the spelling of "containers".
Col 4, line 27, change "21" to -- 24 --.
Col 4, line 34, replace "Vertical" with -- vertical --.
Col 5, line 4, replace "gat" with -- gate --.
Col 5, line 8, replace "travel." with -- travel, --.
Col 5, line 27, replace "FIG. 1.a." with -- FIG. 1.a., --.
Col 5, line 60, replace "alsoshows" with -- also shows --.

UNITED STATES PATENT AND TRADEMARK OFFICE
CERTIFICATE OF CORRECTION

PATENT NO. : 4,779,824
DATED : October 25, 1988
INVENTOR(S) : James E. Leger

It is certified that error appears in the above-identified patent and that said Letters Patent is hereby corrected as shown below:

Col 6, Claim 2, line 1, replace "deliVery" with -- delivery --.
Col 7, Claim 3, line 4, replace "plat" with -- plate --.
Col 7, Claim 3, line 7, correct the spelling of "absorbing".
Col 8, Claim 8, line 36, correct the spelling of "ejector".
Col 8, Claim 8, line 39, correct the spelling of "ejector".
Col 8, Claim 8, line 53, replace "ear" with -- near --.

Signed and Sealed this

Twenty-fifth Day of April, 1989

*Attest:*

DONALD J. QUIGG

*Attesting Officer*   *Commissioner of Patents and Trademarks*